3,542,508
OXIDATION OF FERROUS COMPOUNDS AND
REDUCTION OF FERRIC COMPOUNDS
Eric John Sercombe, Kenton, Middlesex, and Gary James
Keith Acres, Harrow Weald, Middlesex, England, assignors to Johnson Matthey & Co. Limited, London, England, a British company
No Drawing. Filed Nov. 22, 1967, Ser. No. 684,944
Claims priority, application Great Britain, Nov. 23, 1966, 52,377/66
Int. Cl. G01g 49/10, 49/14
U.S. Cl. 23—87                                         9 Claims

ABSTRACT OF THE DISCLOSURE

This invention relates to a continuous method of oxidising ferrous compounds to ferric compounds and of reducing ferric to ferrous compounds. These reactions offer a route to the recovery of iron contained in, for example, sulphuric and hydrochloric acid solutions. This invention affords a continuous method of converting iron in acid solution from one valency state to another, thereby facilitating the recovery of iron from liquors hitherto regarded as waste material.

---

In particular the present invention provides a continuous method of oxidising a ferrous compound to a ferric compound using oxygen or of reducing a ferric compound to a ferrous compound using hydrogen, in which a feedstock containing the ferrous compound or the ferric compound is reacted with oxygen or hydrogen respectively in liquid phase in the presence of a catalyst of a supported platinum group metal (as herein described) in a trickle column reactor. The term "platinum group metals" used herein refers to platinum, palladium, osmium, iridium, ruthenium and rhodium. Preferred catalysts are those containing platinum, palladium or an alloy of platinum and palladium.

This invention relates to a continuous method of oxidising ferrous compounds to ferric compounds and of reducing ferric to ferrous compounds.

These reactions offer a route to the recovery of iron contained in, for example, sulphuric and hydrochloric acid solutions.

In the iron and steel industry considerable quantities of iron are lost in sulphuric acid pickling lines. In such lines, although steps are normally taken to recover the sulphuric acid, iron present in the form of iron oxide is discarded since it is unsuitable for use either in a sintering plant or as blast furnace feed. Iron oxide, in dust form, is also obtained from open hearth operations and this too, is normally discarded since, when used as blast furnace feed, it greatly reduces the performance of the furnace. These losses of iron are expensive and if they could be avoided they would result in a considerable reduction in the cost of steel.

We have now discovered, according to the present invention, a continuous method of converting iron in acid solution from one valency state to another, thereby facilitating the recovery of iron from liquors hitherto regarded as waste material.

Accordingly, this invention provides a continuous method of oxidising a ferrous compound to a ferric compound using oxygen or of reducing a ferric compound to a ferrous compound using hydrogen, in which a feedstock containing the ferrous compound or the ferric compound is reacted with oxygen or hydrogen respectively in liquid phase in the presence of a catalyst of a supported platinum group metal (as herein defined) in a trickle column reactor. The term "platinum group metals" used herein refers to platinum, palladium, osmium, iridium, ruthenium and rhodium. Preferred catalysts are those containing platinum, palladium or an alloy of platinum and palladium.

The ferrous compound may be ferrous sulphate or ferrous chloride and the reaction is conveniently carried out in the presence of excess sulphuric acid to prevent undesirable hydrolysis and formation of ferric hydroxide.

The stoichiometric equation for this reaction is:

$$2FeSO_4 + H_2SO_4 + \tfrac{1}{2}O_2 \rightarrow Fe_2(SO_4)_3 + H_2O$$

The oxidising gas may be oxygen or any gas containing oxygen in appreciable amounts such as atmospheric air or mixtures of gaseous oxygen with one or more inert gases. Large iron and steel plants frequently include air separation plants and, in such instances, the use of pure oxygen may be preferable.

The catalyst support may be alpha- or gamma-alumina, carbon or ceramic materials in the form of granules, pellets, rings or balls, but charcoal supports are preferred. Expanded column packing materials may also be used as catalyst supports.

The concentration of platinum group metal used in the catalyst may be (0.1–10%), and is preferably 1–3% by weight, especially where platinum is used. For example, in the oxidation of ferrous sulphate or ferrous chloride to the corresponding ferric compound, in excellent catalyst comprises platinum on 1–3 mm. Norit charcoal granules. Another very suitable catalyst for use in the oxidation of ferrous sulphate comprises 2% platinum on 8–14 mesh gamma alumina, though the charcoal catalyst is preferred.

The method is preferably carried out by passing the reactants through the catalyst in counter flow but, if desired, the reactants may be passed through the catalyst in the same direction.

The reaction in accordance with the invention possesses the advantage of ease of integration with other continuous flow components in an in-line plant assembly. For example, a column for the removal of catalyst poisons could be fitted in the flow line before the trickle column.

An important advantage of the method of this invention over conventional methods is the elimination of the need to separate the catalyst and by-products of the reaction such as residues of oxidising or reducing agents. When using stirred reactor the catalyst has to be filtered off at the end of the reaction in order to obtain the product, and catalyst for re-use. In the trickle column method, however, the catalyst can remain in the reactor separate from the final product.

The invention is illustrated by the following examples, and in the examples, unless otherwise stated, the ferrous sulphate concentrations are in terms of $FeSO_4 7H_2O$.

EXAMPLE 1

This example describes a continuous process for the oxidation of ferrous sulphate to ferric sulphate.

The reaction was carried out in a trickle column reactor tube having a length of 70 cm. and a diameter of 4 cm. and the reactants were passed through the tube in counter flow. The reactants used were a feedstock containing ferrous sulphate and sulphuric acid supplied to the top of the column at an accurately controlled rate, and oxygen, as the oxidising gas, which was metered and supplied to the bottom of the column. The catalyst used was 3% platinum on 1–3 mm. Norit PK charcoal granules.

The other conditions of this example were as follows:

catalyst bed depth: 20 cm.
Feedstock flow rate: 500 mls./hour.
Oxygen flow rate: 300 mls./minute.
Feedstock composition: 50 gm./litre ferrous sulphate. 5 mls./litre concentrated sulphuric acid.
Temperature: 20° C.

The conversion of ferrous sulphate to ferric sulphate obtained was 97.7%.

The conversion efficiency was determined by analysis of samples of effluent from the bottom of the column.

The ferrous iron concentration in a sample was determined by titrating it against standard potassium dichromate in acid solution using N-phenylanthranilic acid as an indicator. The total iron in a solution was determined by treating the sample with zinc dust and excess acid to reduce all the iron to the ferrous state, and then titrating as above.

EXAMPLES 2–7

The method of Example 1 was repeated but using other concentrations of ferrous sulphate and sulphuric acid in the feedstock as shown in the following table which also shows the conversions obtained.

| Example No.: | Sulphuric acid, mls./litre | Ferrous sulphate, gm./litre | Conversion, percent |
|---|---|---|---|
| 2 | 7.5 | 75 | 87.0 |
| 3 | 25 | 50 | 100 |
| 4 | 25 | 75 | 90.8 |
| 5 | 25 | 100 | 71.0 |
| 6 | 50 | 75 | 90.5 |
| 7 | 100 | 50 | 94.3 |

EXAMPLES 8–10

Example 1 was repeated except that the depth of catalyst bed, composition of feedstock and temperature were as follows:

Feedstock composition: 100 gm. ferrous sulphate/litre. 100 ml. concentrated sulphuric acid/litre.
Temperature: 27° C.

| Example No.: | Depth of catalyst bed, cm. | Conversion, percent |
|---|---|---|
| 8 | 26.5 | 80.5 |
| 9 | 32.5 | 91.5 |
| 10 | 50.0 | 99.8 |

EXAMPLES 11–13

Example 8 was repeated except that the depth of catalyst bed was 20 cm. and feedstock flow rates were as shown below:

| Example No.: | Feedstock flow rate, ml./hour | Conversion, percent |
|---|---|---|
| 11 | 400 | 78.9 |
| 12 | 325 | 88.5 |
| 13 | 250 | 99.7 |

EXAMPLE 14

This example compares the continuous method of the invention as applied to the oxidation of ferrous sulphate to ferric sulphate with the same reaction carried out in a batch process.

The trickle column reactor had a cross-sectional area 16.6 cms.$^2$ and column length 20 cms. and the catalyst was 3% platinum on 1 to 3 mm. charcoal granules. In order to carry a solution of 100 g./litre FeSO$_4$7H$_2$O and 100 ml./litre concentrated H$_2$SO$_4$, to 99% conversion in a trickle column reactor a flow rate of 276 mls./hour at 27° C. was required and, consequently, the time to process 10 litres of solution was 36.2 hours.

In comparison a batch process using a stirred reactor of equal volume to the trickle column (332.4 mls.) and using the same feedstock solution (with the usual catalyst ratio of 1:1000 w./v. of 3% platinum on powdered charcoal), the time required to carry the reaction to 99% conversion was 117 minutes. Thus, in order to process 10 litres of solution in the batch process 30 separate runs would be required, and the total time spent in reacting the solution, excluding time spent recharging the reactor, would be 58.5 hours.

EXAMPLE 15

This example describes the oxidation of ferrous chloride to ferric chloride using the general procedure and apparatus described in Example 1 but under the following conditions:

Feedstock composition: 100 g./litre FeCl$_2$4H$_2$O. 75 ml./litre concentrated hydrochloric acid.
Feedstock flow rate: 35 ml./hour.
Oxygen flow rate: 300 ml./min.
Bed depth of catalyst: 100 cm.
Temperature: 27° C.
Catalyst: 2% platinum on 3–5 mm. carbon granules.

The conversion of ferrous to ferric chloride was 99%.

EXAMPLE 16

This example describes the reduction of ferric sulphate to ferrous sulphate with hydrogen using the general procedure and apparatus described in Example 1 but under the following conditions:

Solution composition: 100 g./litre ferrous sulphate. 100 ml./litre concentrated sulphuric acid.
Feedstock flow rate: 321 ml./hour.
Hydrogen flow rate: 500 ml./minute.
Bed depth of catalyst: 100 cm.
Temperature: 27° C.
Catalyst: 3% platinum on 3–5 mm. carbon granules.

The conversion of ferric to ferrous sulphate obtained was 99%.

EXAMPLE 17

This example describes the reduction of ferric chloride to ferrous chloride with hydrogen using the general procedure and apparatus of Example 1 but under the following conditions:

Solution composition: 100 g./litre FeCl$_3$6H$_2$O 100 ml./litre concentrated hydrochloric acid.
Feedstock flow rate: 575 ml./hour.
Hydrogen flow rate: 500 ml./minute.
Bed depth of catalyst: 100 cm.
Temperature: 27° C.
Catalyst: 3% platinum on 3–5 mm. carbon granules.

The conversion of ferric to ferrous chloride was 99%.

Although platinum is the preferred catalyst metal, satisfactory results can be obtained when the platinum catalysts of the preceding examples are replaced by palladium, osmium, iridium, rhodium or ruthenium, especially palladium.

It will be appreciated from the foregoing that the method of the invention provides a means of extracting iron from low-grade ores in which the ore is extracted with, for instance, sulphuric or hydrochloric acid and the resulting acid solution subjected to the method of this invention.

What we claim is:

1. A continuous method for the respective oxidation or reduction of ferrous or ferric chloride or sulphate to obtain the corresponding ferric or ferrous compound, respectively, in acidic solutions derived from steel mill pickling liquors in which said solutions are fed into the top of a trickle reaction zone and therein reacted as the solution trickles down through said zone with oxygen or hydrogen respectively in the presence of a catalyst comprising a metal selected from the group consisting of Pt, Pd, Os, Ru, Rh, and Ir and having as support a material selected from the group alpha alumina, gamma alumina, carbon and ceramic material and recovering the ferric or ferrous product from said solution.

2. A method according to claim 1, in which ferrous chloride is oxidised to ferric chloride.

3. A method according to claim 1, in which ferric chloride is reduced to ferrous chloride.

4. A process as in claim 1 wherein the oxidation or reduction is substantially complete.

5. A process as in claim 1 wherein the acidic solution is selected from the group consisting of sulfuric acid solutions and hydrochloric acid solutions.

6. A process as in claim 1 wherein the metal is platinum.

7. A process as in claim 1 wherein the reacting step includes passing an oxygen-containing or hydrogen-containing gas countercurrently with respect to said solution.

8. A continuous method for the respective oxidation or reduction of ferrous chloride or sulphate or ferric chloride or sulphate to obtain the corresponding ferric or ferrous compounds, respectively, in acidic solutions derived from steel pickling liquor comprising trickling the solution downwardly on the surfaces of a body of a catalytic packing material which comprises a metal selected from the group consisting of Pt, Pd, Os, Ru, and Ir supported on a material selected from the group consisting of alpha alumina, gamma alumina, carbon and ceramic material; reacting the trickling solution with oxygen or hydrogen, respectively, by passing an oxygen-containing or hydrogen-containing gas in contact with the trickling solution and recovering the ferric or ferrous product from said solution.

9. A process as in claim 8 wherein the solution is a sulfuric acid solution containing excess sulfuric acid and wherein the oxidation or reduction is substantially complete.

References Cited

UNITED STATES PATENTS

| | | | |
|---|---|---|---|
| 1,430,551 | 10/1922 | Herrly | 23—126 |
| 1,606,470 | 11/1926 | Grant et al. | 23—126 |
| 2,231,181 | 2/1941 | Brooks | 23—126 |
| 2,719,074 | 9/1955 | Brace | 23—87 |
| 2,762,700 | 9/1956 | Brooks | 23—87 XR |
| 2,922,698 | 1/1960 | Moser | 23—126 |
| 3,109,732 | 11/1963 | Goren | 23—126 XR |
| 3,284,351 | 11/1966 | Dajani et al. | 23—126 XR |
| 242,546 | 6/1881 | Lawton et al. | 23—2 XR |
| 3,460,903 | 8/1969 | Holemann et al. | 23—87 |

FOREIGN PATENTS

| | | |
|---|---|---|
| 1,145,598 | 3/1963 | Germany. |

EDWARD STERN, Primary Examiner

U.S. Cl. X.R.

23—126